(12) United States Patent
Pedersen

(10) Patent No.: US 9,672,035 B2
(45) Date of Patent: Jun. 6, 2017

(54) DATA PROCESSING APPARATUS AND METHOD FOR PERFORMING VECTOR PROCESSING

(71) Applicant: ARM LIMITED, Cambridge (GB)

(72) Inventor: Ronny Pedersen, Trondheim (NO)

(73) Assignee: ARM Limited, Cambridge (GB)

( * ) Notice: Subject to any disclaimer, the term of this patent is extended or adjusted under 35 U.S.C. 154(b) by 253 days.

(21) Appl. No.: 14/504,947

(22) Filed: Oct. 2, 2014

(65) Prior Publication Data
US 2015/0149744 A1    May 28, 2015

(30) Foreign Application Priority Data

Nov. 26, 2013  (GB) .................................. 1320854.1

(51) Int. Cl.
*G06F 15/76*    (2006.01)
*G06F 15/00*    (2006.01)
(Continued)

(52) U.S. Cl.
CPC ...... *G06F 9/30036* (2013.01); *G06F 15/8053* (2013.01)

(58) Field of Classification Search
None
See application file for complete search history.

(56) References Cited

U.S. PATENT DOCUMENTS

| 5,179,702 | A | * | 1/1993 | Spix | .......................... | G06F 8/41 |
| | | | | | | 711/E12.006 |
| 5,471,593 | A | * | 11/1995 | Branigin | ............. | G06F 9/30018 |
| | | | | | | 712/219 |

(Continued)

FOREIGN PATENT DOCUMENTS

| EP | 1 873 627 | 1/2008 |
| GB | 2 409 064 | 6/2005 |
| WO | WO 2006/007193 | 1/2006 |

OTHER PUBLICATIONS

Search Report for GB 1 320 854.1 dated Apr. 24, 2014 (1 page).

*Primary Examiner* — Michael Sun
(74) *Attorney, Agent, or Firm* — Nixon & Vanderhye P.C.

(57) ABSTRACT

A data processing apparatus and method are provided for processing execution threads, where each execution thread specifies at least one instruction. The data processing apparatus has a vector processing unit providing a plurality M of lanes of parallel processing, within each lane the vector processing unit being configured to perform a processing operation on a data element input to that lane for each of one or more input operands. A vector instruction is received that is specified by a group of the execution threads, that vector instruction identifying an associated processing operation and also providing an indication of the data elements of each input operand that are to be subjected to that associated processing operation. Vector merge circuitry then determines, based on that information, a required number of lanes of parallel processing for performing the associated processing operation. If it is determined that the required number of lanes is less than or equal to half the available number of lanes within the vector processing unit, then the vector merge circuitry allocates a plurality of the execution threads of the group to the vector processing unit such that each execution thread in that plurality is allocated different lanes amongst the available lanes of parallel processing. As a result, the vector processing unit then performs the associated processing operation in parallel for each of the plurality of execution threads, significantly increasing performance.

17 Claims, 14 Drawing Sheets

(51) Int. Cl.
 *G06F 9/30* (2006.01)
 *G06F 15/80* (2006.01)

(56) References Cited

U.S. PATENT DOCUMENTS

| | | | | |
|---|---|---|---|---|
| 2007/0255894 A1* | 11/2007 | Hessel | ............... | G06F 9/30036 |
| | | | | 711/105 |
| 2010/0199257 A1* | 8/2010 | Biggerstaff | ............... | G06F 8/76 |
| | | | | 717/104 |
| 2013/0159668 A1* | 6/2013 | Muff | ............... | G06F 15/8053 |
| | | | | 712/7 |
| 2014/0082328 A1* | 3/2014 | Gopal | ............... | G06F 9/3001 |
| | | | | 712/208 |

* cited by examiner

| ADDRESS | BANK 0 | BANK 1 | BANK 2 | BANK 3 | BANK 4 | BANK 5 | BANK 6 | BANK 7 |
|---|---|---|---|---|---|---|---|---|
| QUAD BASE OFFSET | $R0_{T0}$ | $R0_{T1}$ | $R0_{T2}$ | $R0_{T3}$ | $R1_{T0}$ | $R1_{T1}$ | $R1_{T2}$ | $R1_{T3}$ |
| QUAD BASE OFFSET+1 | $R2_{T2}$ | $R2_{T3}$ | $R2_{T0}$ | $R2_{T1}$ | $R3_{T2}$ | $R3_{T3}$ | $R3_{T0}$ | $R3_{T1}$ |
| QUAD BASE OFFSET+2 | $R4_{T1}$ | $R4_{T0}$ | $R4_{T3}$ | $R4_{T2}$ | $R5_{T1}$ | $R5_{T0}$ | $R5_{T3}$ | $R5_{T2}$ |
| QUAD BASE OFFSET+3 | $R6_{T3}$ | $R6_{T2}$ | $R6_{T1}$ | $R6_{T0}$ | $R7_{T3}$ | $R7_{T2}$ | $R7_{T1}$ | $R7_{T0}$ |

430

PATTERN REPEATS FOR R8 UPWARDS

FIG. 7

DATA PROCESSING APPARATUS AND METHOD FOR PERFORMING VECTOR PROCESSING

BACKGROUND

The present invention relates to a data processing apparatus and method for performing vector processing.

Vector processing is a known technique for seeking to improve the performance of a data processing apparatus. In accordance with vector processing, a vector processing unit can be provided that has a plurality of lanes of parallel processing. Within each lane, the vector processing unit can be arranged to perform a processing operation on a data element input to that lane for each of one or more input operands for the processing operation. Accordingly, when an instruction is executed by the vector processing unit, the processing operation defined by that instruction is performed in parallel within each of the lanes of parallel processing, each lane receiving different data elements from each input operand specified by the instruction. Such an approach is often referred to as a Single Instruction Multiple Data (SIMD) approach.

By such an approach, a SIMD instruction can be executed once within the vector processing unit, rather than having to execute an equivalent scalar instruction multiple times within a scalar processing unit, hence enabling significant performance benefits to be realised.

However, the provision of such vector processing units is typically relatively expensive when compared with equivalent scalar processing circuitry. The inventor of the present invention realised that in many practical implementations, there are periods of time where the vector processing unit is quite underutilised, and in particular the vector processing unit may often be used to execute vector instructions that do not require use of all of the lanes of parallel processing provided by the vector processing unit.

One of the reasons why underutilised lane usage can arise is due to limitations in compilers. For instance, considering the example of a graphics processing unit, shader compilers often need to do runtime compilation before the shader is executed, which can lead to constraints on the amount of resources and time available for compilation. Further, often software developers do not make use of vector features in modern APIs, be it because of legacy software, time constraints on development, etc.

It would hence be desirable to provide a mechanism for making more efficient use of the vector processing resources within a data processing apparatus.

This application claims priority to GB 1320854.1 filed 26 Nov. 2013, the entire contents of which is hereby incorporated by reference.

SUMMARY

Viewed from a first aspect, the present invention provides a data processing apparatus for processing execution threads, each execution thread specifying at least one instruction, the data processing apparatus comprising: a vector processing unit providing a plurality M of lanes of parallel processing, within each lane the vector processing unit being configured to perform a processing operation on a data element input to that lane for each of one or more input operands; an input interface configured to receive a vector instruction that is specified by a group of said execution threads, the vector instruction identifying an associated processing operation and providing an indication of the data elements of each input operand to be subjected to said associated processing operation; vector merge circuitry configured to determine, having regard to the indication of the data elements, a required number of lanes of parallel processing for performing the associated processing operation of the vector instruction, the vector merge circuitry being further configured, if the required number of lanes of parallel processing is less than or equal to M/2, to allocate a plurality of the execution threads of the group to the vector processing unit such that each execution thread in said plurality is allocated different lanes amongst said M lanes of parallel processing; and the vector processing unit configured, responsive to the vector merge circuitry allocating a plurality of the execution threads of the group to the vector processing unit, to perform the associated processing operation in parallel for each of said plurality of execution threads.

Viewed from a second aspect, the present invention provides a method of processing execution threads, each execution thread specifying at least one instruction, comprising: providing a plurality M of lanes of parallel processing within a vector processing unit, within each lane the vector processing unit performing a processing operation on a data element input to that lane for each of one or more input operands; inputting a vector instruction that is specified by a group of said execution threads, the vector instruction identifying an associated processing operation and providing an indication of the data elements of each input operand to be subjected to said associated processing operation; determining, having regard to the indication of the data elements, a required number of lanes of parallel processing for performing the associated processing operation of the vector instruction, and if the required number of lanes of parallel processing is less than or equal to M/2, allocating a plurality of the execution threads of the group to the vector processing unit such that each execution thread in said plurality is allocated different lanes amongst said M lanes of parallel processing; and responsive to allocating a plurality of the execution threads of the group to the vector processing unit, causing the vector processing unit to perform the associated processing operation in parallel for each of said plurality of execution threads.

Viewed from a third aspect, the present invention provides a data processing apparatus for processing execution threads, each execution thread specifying at least one instruction, the data processing apparatus comprising: vector processing means for providing a plurality M of lanes of parallel processing, within each lane the vector processing means for performing a processing operation on a data element input to that lane for each of one or more input operands; input interface means for receiving a vector instruction that is specified by a group of said execution threads, the vector instruction identifying an associated processing operation and providing an indication of the data elements of each input operand to be subjected to said associated processing operation; vector merge means for determining, having regard to the indication of the data elements, a required number of lanes of parallel processing for performing the associated processing operation of the vector instruction, the vector merge means further for allocating, if the required number of lanes of parallel processing is less than or equal to M/2, a plurality of the execution threads of the group to the vector processing means such that each execution thread in said plurality is allocated different lanes amongst said M lanes of parallel processing; and the vector processing means for performing, responsive to the vector merge means allocating a plurality of the execution threads of the group to the vector processing means, the associated processing operation in parallel for each of said plurality of execution threads.

BRIEF DESCRIPTION OF THE DRAWINGS

The present invention will be described further, by way of example only, with reference to embodiments thereof as illustrated in the accompanying drawings, in which:

FIG. 7 is a table illustrating how operands for different threads may be allocated to the various banks of the working registers in accordance with one embodiment;

DESCRIPTION OF EXAMPLE EMBODIMENTS

Figure 1A:
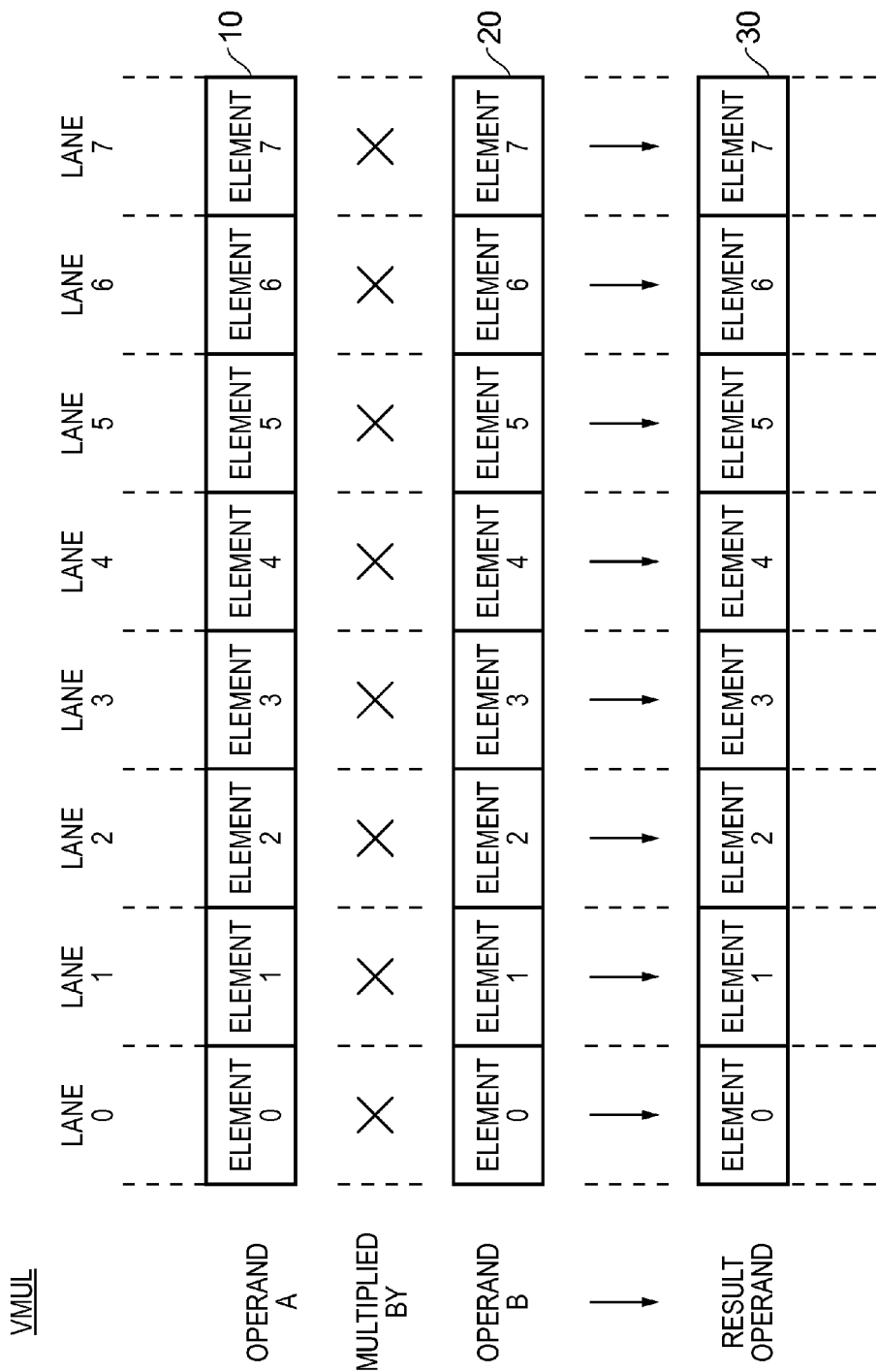
FIG. 1A is a diagram schematically illustrating the lanes of parallel processing provided within a vector processing unit in accordance with one embodiment.

Viewed from a first aspect, there is provided a data processing apparatus for processing execution threads, each execution thread specifying at least one instruction, the data processing apparatus comprising: a vector processing unit providing a plurality M of lanes of parallel processing, within each lane the vector processing unit being configured to perform a processing operation on a data element input to that lane for each of one or more input operands; an input interface configured to receive a vector instruction that is specified by a group of said execution threads, the vector instruction identifying an associated processing operation and providing an indication of the data elements of each input operand to be subjected to said associated processing operation; vector merge circuitry configured to determine, having regard to the indication of the data elements, a required number of lanes of parallel processing for performing the associated processing operation of the vector instruction, the vector merge circuitry being further configured, if the required number of lanes of parallel processing is less than or equal to M/2, to allocate a plurality of the execution threads of the group to the vector processing unit such that each execution thread in said plurality is allocated different lanes amongst said M lanes of parallel processing; and the vector processing unit configured, responsive to the vector merge circuitry allocating a plurality of the execution threads of the group to the vector processing unit, to perform the associated processing operation in parallel for each of said plurality of execution threads.

The inventor of the present invention realised that often a data processing apparatus including a vector processing unit is used to process execution threads, where each execution thread specifies at least one instruction. The inventor also observed that often multiple of the execution threads need to execute the same instruction. In accordance with the present invention, an input interface receives a vector instruction that is specified by a group of execution threads. Vector merge circuitry then determines the required number of lanes of parallel processing for performing the processing operation associated with the vector instruction, and if the required number of lanes is less than half the total available number of lanes within the vector processing unit, the vector merge circuitry then allocates a plurality of the execution threads of the group to the vector processing unit such that each execution thread is allocated different lanes amongst the lanes of parallel processing. Thereafter, the vector processing unit then performs the associated processing operation in parallel for each of the plurality of execution threads allocated to the vector processing unit, this being referred to herein as vector merge processing.

Accordingly, whereas previously each vector instruction executed by the vector processing circuitry would be executed for one particular thread, and hence, if the same vector instruction had to be executed by several threads, that vector instruction would be executed multiple times by the vector processing circuitry (once for each thread), in accordance with the present invention the vector merge circuitry detects situations where it is possible to make more efficient use of the available lanes of parallel processing in order to cause the single execution of a vector instruction to perform the associated processing operation in parallel for multiple execution threads. Such an approach can give rise to significant performance benefits, by allowing more efficient use of the vector processing unit.

In one embodiment, the group of execution threads comprises N execution threads, and the vector merge circuitry is configured, if the required number of lanes of parallel processing is less than or equal to M/N, to allocate all of the execution threads in the group to the vector processing unit such that the vector processing unit then performs the associated processing operation in parallel for each of the execution threads in the group. Hence, in such situations, it will be possible to perform the associated processing operation specified by the vector instruction in parallel for each of the execution threads in the group, thereby giving rise to significant performance improvements.

However, it will not always be possible to perform the processing operation in parallel for all of the execution threads in the group, but it may nonetheless be possible to still achieve performance improvements. For example, if the required number of lanes of parallel processing is less than or equal to M/2, but is not less than or equal to M/N, the vector merge circuitry may be configured to allocate a plurality of execution threads of the group to the vector processing unit during a first allocation cycle, and then to allocate a different plurality of the execution threads of the group to the vector processing unit in one or more subsequent allocation cycles, until all of the execution threads of the group have been allocated to the vector processing unit.

Whilst in one embodiment the data processing apparatus may include a single vector processing unit, it may in an alternative embodiment have more than one vector processing unit. In particular, in one embodiment, the data processing apparatus further comprises a further vector processing unit also providing said plurality M of lanes of parallel processing, and the input interface is configured to receive an instruction block containing the vector instruction whose associated processing operation is to be performed by the vector processing unit and a further vector instruction whose associated processing operation is to be performed by the further vector processing unit, both the vector instruction and the further vector instruction being specified by the group of execution threads. The further vector instruction also provides an indication of the data elements of each input operand to be subjected to its associated processing operation, and the vector merge circuitry is configured to have regard to the indication of the data elements provided by the vector instruction and the indication of the data elements provided by the further vector instruction when determining the required number of lanes of parallel processing, such that the required number of lanes of parallel processing is dependent on which of the vector instruction and the further vector instruction requires the most lanes in order to perform its associated processing operation.

Hence, in situations where multiple vector processing units are provided, and the input interface receives an instruction block containing separate vector instructions for those multiple vector processing units, then the vector merge circuitry takes into account which vector instruction requires the most lanes in order to perform its associated processing operation when deciding whether vector merge processing can or cannot be performed. Assuming vector merge processing can be performed, then that vector merge processing will be performed in each of the vector processing units.

In one embodiment, the data processing apparatus may include one or more vector processing units, but no scalar processing units. However, in an alternative embodiment the vector processing unit can include one or more scalar processing units. In one particular embodiment, the data processing apparatus further comprises a group of scalar processing units, each scalar processing unit in the group being configured to perform the same scalar processing operation, and the input interface is configured to receive an instruction block containing the vector instruction whose associated processing operation is to be performed by the vector processing unit, and a scalar instruction specifying an associated processing operation to be performed by one of the scalar processing units. The vector merge circuitry further comprises scalar allocation circuitry, and responsive to the vector merge circuitry allocating a plurality of the execution threads of the group to the vector processing unit, the scalar allocation circuitry is configured to allocate each of said plurality of execution threads to a different one of the scalar processing units within said group of scalar processing units, such that the associated scalar operation is performed in parallel for each of said plurality of execution threads.

By such an approach, and in particular by replicating the scalar processing units, then in the event that the vector merge circuitry determines that vector merge processing is possible, the replicated scalar processing units can be used such that the associated scalar operation is performed in parallel for each of the plurality of execution threads to be subjected to vector merge processing. Hence, such an approach still enables vector merge processing to be performed, even where the instruction block contains a scalar instruction.

The number of scalar units within the group can vary dependent on embodiment, but in one embodiment N scalar units are provided, i.e. the same number of scalar units are provided as the number of threads in a thread group. This ensures that in a situation where the maximum level of vector merge processing can be performed, i.e. with all threads in the thread group being allocated to a vector processing unit for performance of the associated processing operation in parallel, there are sufficient scalar units for the scalar operation to also be performed in parallel for each of those threads.

As a further optional enhancement, in one embodiment, the instruction block may include a field which, when set, indicates that the scalar instruction is to be treated as an additional vector instruction, and the group of scalar processing units are to be treated collectively as forming an additional vector processing unit for performing the associated processing operation of the additional vector instruction. This would hence allow re-use of the replicated scalar units as a vector processing unit for performing simple vector operations.

The operand data required by the data processing apparatus may be provided in a variety of ways. In one embodiment, the data processing apparatus further comprises a set of registers for storage of the input operands associated with each execution thread in said group, the vector instruction being configured to provide an input operand identifier for each input operand to be subjected to the associated processing operation. Register determination circuitry is then configured, for each execution thread allocated to the vector processing circuitry, to determine from each input operand identifier a register in the set of registers containing the corresponding input operand associated with that execution thread, and to cause the set of registers to be accessed in order to output the corresponding input operand from the determined register. In such an embodiment, the actual register storing the input operand data for an associated input operand identifier will vary dependent on the execution thread, and hence the input operand identifier is used in association with the execution thread information in order to determine the required register to be accessed.

In one embodiment, the vector merging circuitry is configured, when allocating a plurality of the execution threads of the group to the vector processing unit such that each execution thread in that plurality is allocated different lanes amongst the M lanes of parallel processing, to maintain lane allocation data identifying which lanes have been allocated to each execution thread in said plurality. The data processing apparatus further comprises operand routing circuitry configured to receive the input operand output from each determined register and to route the required data elements of that input operand to the lanes indicated by the lane allocation data as having been allocated to the execution thread that that input operand is associated with. Hence, in situations where vector merge processing is being performed, the operand routing circuitry has access to the lane allocation data, and accordingly can decide how any received input operand data needs to be routed in order to provide it to the appropriate lanes of a vector processing unit.

The registers can be arranged in a variety of ways, but in one embodiment the set of registers are formed as a plurality of banks, with each bank being accessible separately in each register access cycle. In one embodiment, if there are W banks, then up to W read accesses may be performed in each register access cycle, with one read access being directed to each bank.

In one embodiment, the register determination circuitry further comprises register scheduling circuitry configured to schedule the register accesses required to access the determined registers having regard to the bank in which each determined register resides. Hence, the register scheduling circuitry can determine whether there are any bank conflicts present having regard to the determined registers that need to be accessed, for example due to multiple determined registers residing within the same bank, and can then schedule the register accesses accordingly. In the event of such bank conflicts, it will be necessary to stage the register accesses over multiple register access cycles. In one embodiment, a separate read operation can be performed each clock cycle, and accordingly there is a register access cycle every clock cycle.

In situations where not all of the execution threads in the group can be allocated at the same time to the vector processing unit, but it is still possible to allocate a plurality of execution threads at a time, the vector merge circuitry needs to determine which plurality of execution threads in the group to allocate together to the vector processing unit. This can be predetermined, or alternatively the vector merge circuitry may seek to allocate the plurality of execution threads with the aim of choosing execution threads that are less likely to cause any processing bottlenecks. In one particular example of such an approach, the merging circuitry is configured, when determining which plurality of execution threads from the group to allocate in each allocation cycle, to perform a bank conflict checking operation with reference to the register determination circuitry in order to choose the plurality of execution threads for each allocation cycle so as to seek to reduce occurrence of multiple registers needing to be accessed from the same bank for any chosen plurality of execution threads. Accordingly, by such an approach, the choice as to how the execution threads of the group are combined to form the plurality of execution threads allocated to the vector processing unit at any point in time can be chosen so as to seek to reduce bank conflicts, and hence reduce any delays associated with obtaining the required operand data from the registers.

In one embodiment, the data processing apparatus further comprises result operand handling circuitry that is responsive to result data being generated by the vector processing circuitry to reference the lane allocation data in order to identify the lanes containing the result operand for each allocated execution thread, and to then reference the register determination circuitry in order to determine for each result operand the register within the set of registers that the result operand is to be written to. Hence, the result operand handling circuitry makes reference to the lane allocation data in situations where vector merge processing has been performed in order to determine how the result data should be routed back for storing in the registers.

In one embodiment, the vector processing unit is provided in a first pipeline stage, and the data processing apparatus further comprises one or more additional processing units provided in a subsequent pipeline stage. Forwarding circuitry is then configured to route output data from the first pipeline stage to the inputs of the subsequent pipeline stage, said routing being dependent on how execution threads have been allocated to the vector processing unit by the vector merge circuitry. Accordingly, in situations where multiple pipeline stages are provided, the forwarding circuitry between the pipeline stages can be configured so that the routing it performs is dependent on how execution threads have been allocated to a vector processing unit by the vector merge circuitry in a previous pipeline stage, thus allowing vector merge processing to be performed whilst still enabling correct routing of data between the various pipeline stages.

The data processing apparatus can take a variety of forms, and be used in a variety of application areas. In one particular instance the data processing apparatus is provided within a graphics processing unit. In one specific example, the data processing apparatus forms an arithmetic pipeline provided within a shader unit of a graphics processing unit, such an arithmetic pipeline being used to perform a variety of vector processing operations. Within such an embodiment, it is often the case that there are clearly defined groups of threads which need to execute the same instructions, and accordingly the above described techniques are particularly beneficial in such an embodiment.

FIG. 1A schematically illustrates the lanes of parallel processing that may be provided within a vector processing unit in accordance with one embodiment. In this example, eight lanes of parallel processing are provided. Further, it is assumed that a vector instruction in the form of a vector multiply (VMUL) instruction specifies a multiplication operation to be performed on operands A and B. As shown, operand A 10 includes eight data elements, with one data element being placed in each of the lanes, and similarly operand B 20 includes eight data elements, with one element being placed in each of the lanes. The multiplication operation is then performed in parallel in each of the lanes, resulting in the generation of a result operand 30 containing eight result data elements.

Whilst the number of lanes provided by the vector processing unit, and the width of each lane, will vary dependent on embodiments, in one particular example embodiment there are eight lanes each having a width of 16 bits, hence giving an overall data path width of 128 bits. In that example, each of the data elements shown in FIG. 1A is 16 bits in size.

Figure 1B:
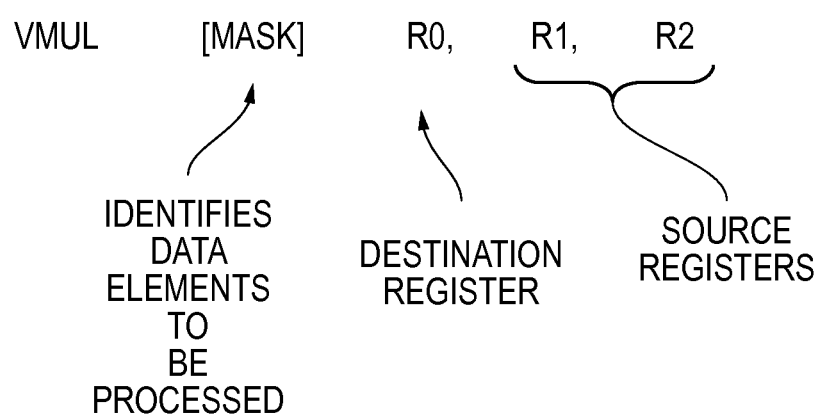
FIG. 1B is a diagram schematically illustrating a vector instruction in accordance with one embodiment.

FIG. 1B schematically illustrates information specified by a vector instruction, for consistency with FIG. 1A a vector multiply (VMUL) instruction again being considered, although it will be appreciated that the same basic information will be provided for any vector instruction. As shown, the vector instruction specifies a number of source registers that contain the input operands to be operated on when executing the vector instruction. As will be discussed in more detail later, the source registers specified by the instruction actually form a register identifier, which will then need mapping to a particular register within the working registers of the data processing apparatus. In addition to the source registers there will typically also be a destination register specified, and again this will be specified by a register identifier that will need mapping to a particular register within the working registers of the apparatus. Hence, in this particular example, the instruction specifies that the data elements in register R1 should be multiplied by the data elements in register R2, with the results then being stored back to the register R0.

If all of the data elements within the source registers are to be subjected to the operation, then a very efficient use of the vector processing unit can be realised, as shown in FIG. 1A, where each of the lanes performs one of the required operations. However, mask information can be included within each vector instruction, identifying the actual data elements that need to be processed. For example, it is often the case that not all of the data elements within the source registers are to be subjected to the operation, and accordingly certain of the data elements can be masked out. As a result, when such an instruction is executed on the vector processing circuitry, then it is often the case that a number of the lanes may be unused whilst executing that instruction. As will be discussed in more detail below, the described embodiments seek to identify such situations, and make better use of the vector processing unit in such situations.

In particular, the inventor has realised that there are many situations where a data processing apparatus incorporating such a vector processing unit is used to process different execution threads. Further, the inventor realised that often there are multiple execution threads that require the same instruction to be executed, albeit on data associated with the particular thread. In accordance with the described embodiments, the data processing apparatus can be arranged to receive an instruction along with an indication of a group of execution threads that require that instruction to be executed, and can then seek to identify situations where it is possible to make more efficient use of the available lanes of parallel processing in order to allow that instruction to be executed in parallel for multiple of the execution threads within that group.

Figure 2:
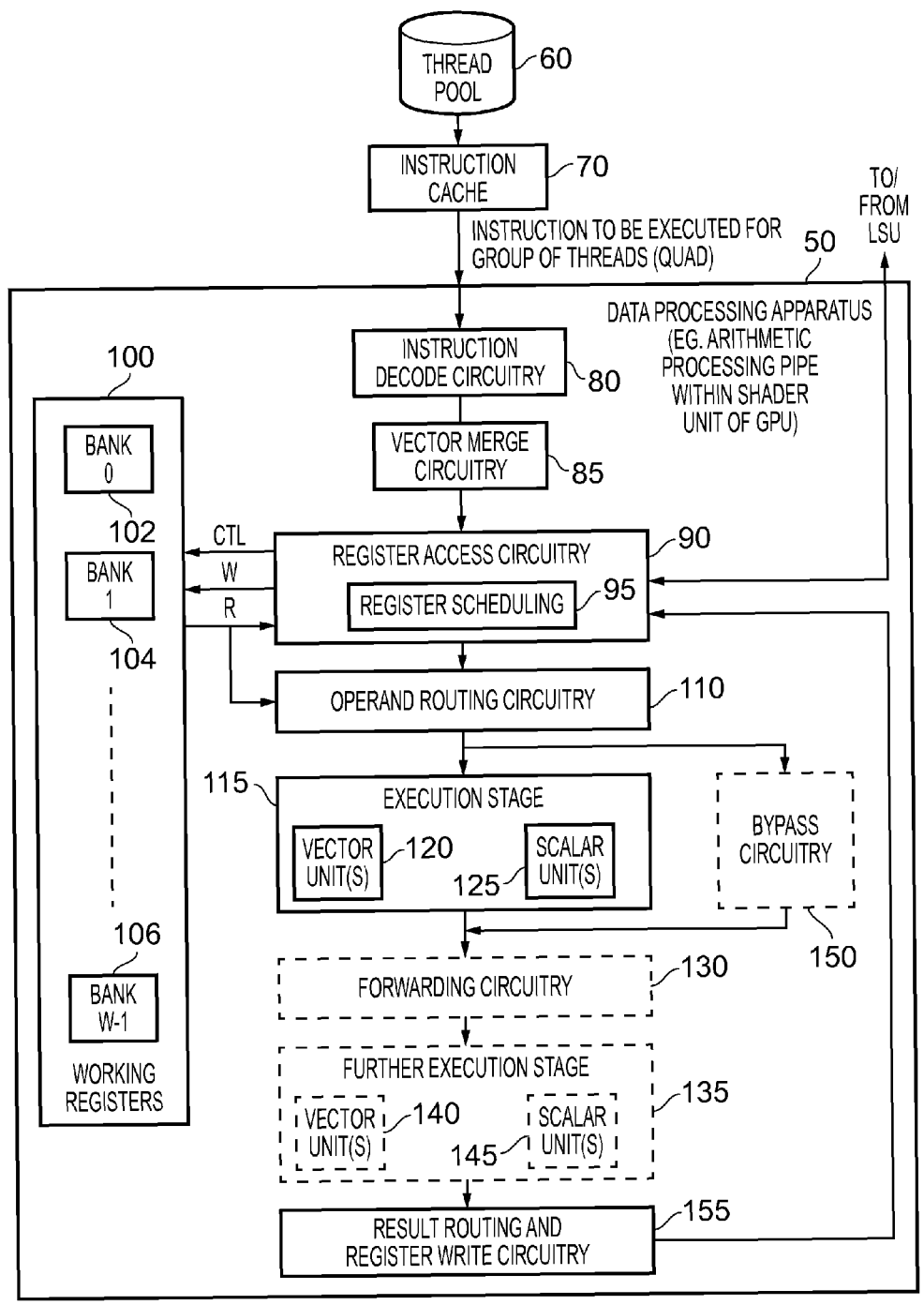
FIG. 2 is a block diagram of a data processing apparatus in accordance with one embodiment.

FIG. 2 illustrates a data processing apparatus 50 in accordance with one embodiment. A thread pool 60 is maintained containing information about each of the execution threads that requires processing. Typically one or more instructions will need executing for each execution thread, and accordingly within the thread pool each thread can be allocated a thread identifier, and information identifying the instructions required to be executed. For example, in one embodiment, a program counter value can be maintained for each of the identified threads. Instructions to be executed can then be retrieved into the instruction cache 70, for onward provision to the data processing apparatus 50. In accordance with one embodiment, if a particular vector instruction needs executing by a group of execution threads, that instruction can be forwarded to the data processing apparatus, along with an indication of the group of execution threads for which that instruction needs to be executed. The instruction decode circuitry 80 then decodes the instruction in order to determine the required processing operations to be performed within the data processing apparatus in order to execute that instruction.

The vector merge circuitry 85 is provided in order to seek to detect situations where the required number of lanes of parallel processing for performing the processing operation associated with a vector instruction is less than or equal to half the total available number of lanes within the relevant vector processing unit, and in such a situation to allocate a plurality of the execution threads of the thread group to the vector processing unit at the same time, with each execution thread being allocated different lanes amongst the available lanes of parallel processing. As a result, the vector processing unit will then perform the associated processing operation in parallel for each of those plurality of execution threads, hence improving performance. In certain situations, it may be possible to allocate all of the execution threads of the group to the vector processing unit at the same time, so that the associated processing operation is performed in parallel for all of the threads in the group. Alternatively, there may not be sufficient lanes to enable all of the threads to be processed in one go, and instead in a first clock cycle a plurality of the threads in the group can be allocated, and in one or more subsequent clock cycles a further plurality of the threads can allocated, until all threads of the thread group have been allocated. In some situations, it may be that the required number of lanes of parallel processing is greater than half the available number of lanes, and in that instance a standard vector processing approach can be adopted, where in each cycle the instruction is allocated to the vector processing unit for one of the threads, so that after a certain number of cycles, the instruction will have been allocated for every thread.

Whilst the number of execution threads in the thread group will vary dependent on embodiment, in one embodiment the group of threads is referred to as a "quad", since it contains four execution threads. It has been found that there are a variety of situations where it can readily be determined that a particular instruction needs executing for four execution threads. For example, in one particular embodiment the data processing apparatus forms part of an arithmetic pipeline within a shader unit of a graphics processing unit. The arithmetic unit can be used to perform a variety of graphics processing operations, and in one particular example may process the graphics fragments generated by a rasterisation stage within the graphics processing unit, often such graphics fragments being output for a 2×2 pixel quad. In such an example, the same instructions will typically need to be executed for each of the pixels within the pixel quad. However, this is only intended to illustrate one particular example, and it will be appreciated that in the more general case there will be a variety of situations where multiple execution threads need the same instructions to be executed, and accordingly can be identified as forming a group of execution threads associated with a particular instruction to be executed within the data processing apparatus.

In the example of FIG. 2, the operand data required when performing processing operations is stored within a set of working registers 100, which in this embodiment are formed by a plurality of register banks 102, 104, 106. Register access circuitry 90 is provided for performing read and write accesses to the working registers. In one embodiment, in any particular clock cycle, a separate write operation and read operation can be performed in respect of each of the banks. Accordingly, if there are W banks, then it will be appreciated that up to W input operands can be read from the working registers per clock cycle by the register access circuitry 90. Additionally, up to W working registers can be written to in a particular clock cycle. Whilst the number of banks will vary dependent on embodiment, in one particular embodiment there are eight banks within the working registers 100.

As shown in FIG. 2, the register access circuitry 90 is coupled to a load store unit (LSU) to allow data to be stored into the working registers 100 from memory prior to operations being performed on that data, and also to allow result data to be written out from the working registers back to memory.

In accordance with the described embodiment, the register access circuitry 90 includes register scheduling circuitry 95 which is used to schedule the read and write accesses to the various banks of the working registers having regard to the locations of the individual registers requiring access. For example, if two registers that need to be read from reside within the same bank, then the register scheduling circuitry will need to schedule those read accesses to separate clock cycles.

Operand routing circuitry 110 is used to receive the data read from the working registers, and to route that data to the required units within the execution stages of the data processing apparatus. Given the possibility for performing vector merge processing dependent on the conclusions reached by the vector merge circuitry 85, if vector merge processing is performed, then the operand routing circuitry 110 also takes into account the lanes allocated to particular threads within a vector processing unit in order to ensure that the operand data is routed to the required lanes of the vector processing unit.

An execution stage 115 is provided for performing a variety of processing operations. This execution stage may include one or more vector units 120 and/or one or more scalar units 125. Whilst all of the vector and scalar units can be provided within a single execution stage, as shown by the dotted boxes in FIG. 2 there may optionally be provided one or more further execution stages 135, each further execution stage also including one or more vector units 140 and/or one or more scalar units 145. Operands only required by the further execution stage 135 can be routed using bypass circuitry 150. Forwarding circuitry 130 can then be used to forward the data received by the bypass circuitry 150, or indeed result data output from the execution stage 115, to the required units within the further execution stage 135. If any vector unit 120 within the execution stage 115 has been subjected to vector merge processing, such that the vector processing operation has been applied in parallel in respect of multiple execution threads, then the routing performed by the forwarding circuitry will take into account how the execution threads have been allocated to the vector processing unit 120 by the vector merge circuitry 85.

The results generated by the execution stage 115 (and any further execution stages 135) are forwarded to the result routing and register write circuitry 155, which is then responsible for issuing requests to the access circuitry 90 to cause the required result operand data to be written back to the relevant registers within the working registers 100. In respect of any result data output by a vector unit that has been subjected to vector merge processing, the result routing and register write circuitry 155 will have access to lane allocation data generated by the vector merge circuitry 85 in order to allow correct interpretation of the various result data elements produced by the vector unit, and in particular to identify which result data elements form part of the result operand data of each of the threads allocated in parallel to the vector unit. Having identified the result data using this process, and having regard to the destination register identifier, it can then be determined which register within the register bank needs to be written to, and an appropriate request can then be sent to the register access circuitry 90.

Figure 3:
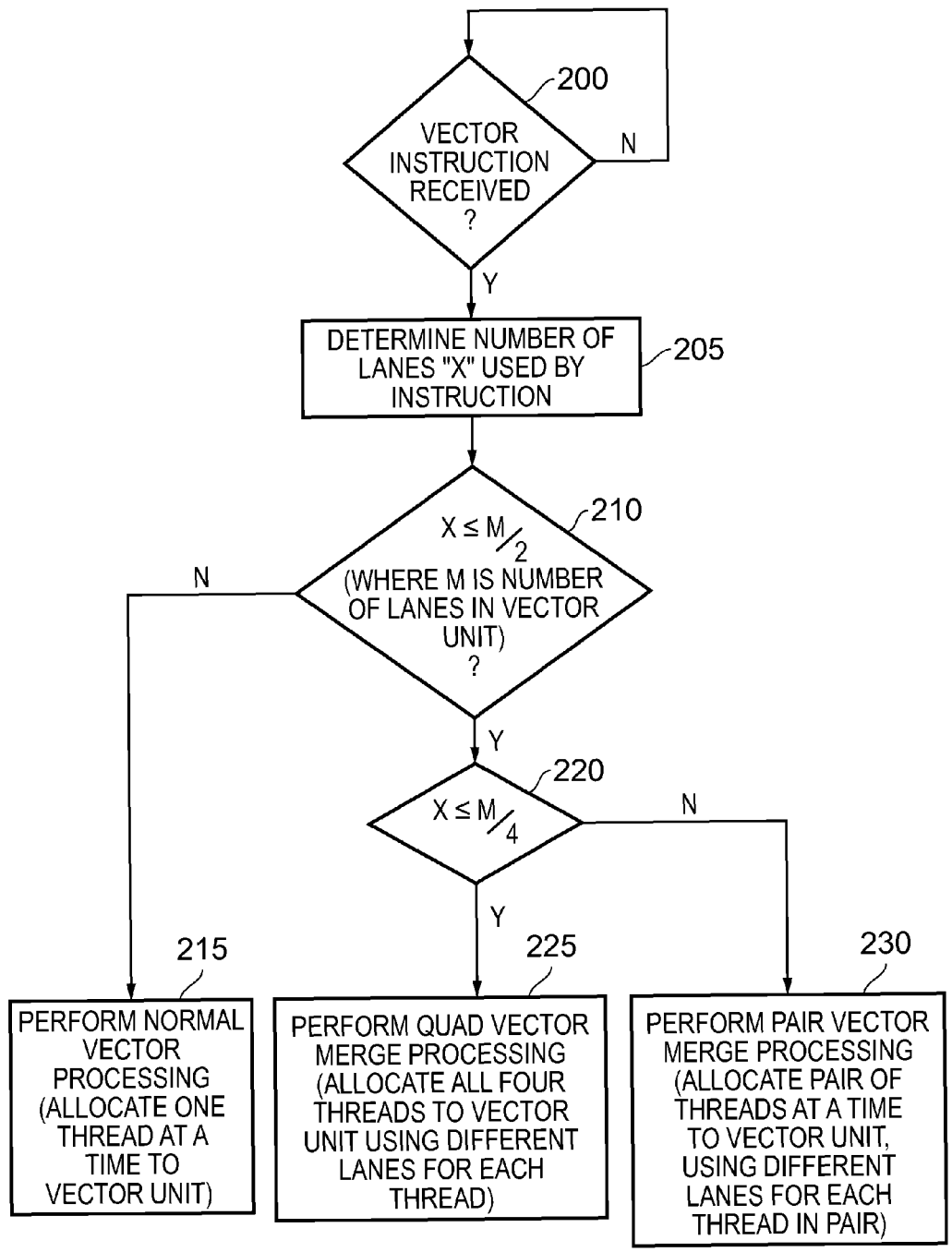
FIG. 3 is a flow diagram illustrating how vector merge processing may be performed within the apparatus of FIG. 2 in accordance with one embodiment.

FIG. 3 is a flow diagram illustrating how vector merge processing may be performed when handling a vector instruction using the apparatus of FIG. 2. At step 200, it is determined whether a vector instruction has been received by the data processing apparatus. If it has, then at step 205 the vector merge circuitry 85 determines the number of lanes X that need to be used in order to perform the associated processing operation on the required data elements. In particular, as discussed earlier with reference to FIG. 1B, mask information may specify the particular data elements that need to be subjected to the operation, and accordingly the mask information can be used in order to determine the required number of lanes of parallel processing.

At step 210, it is then determined whether the required number of lanes X is less than or equal to half the available number of lanes in the relevant vector unit that will be used to execute the vector instruction. If not, the process branches to step 215 where normal vector processing is performed. As discussed earlier, this will involve allocating the instruction in multiple separate cycles to the vector unit, in each cycle the instruction being executed for one of the threads.

If however at step 210 it is determined that the required number of lanes is less than or equal to half the available number of lanes, then the process proceeds to step 220 where it is determined whether in fact the required number of lanes is less than or equal to a quarter of the available lanes. If it is, then the process proceeds to step 225 where quad vector merge processing is performed, and in particular all four threads in the thread group (quad) are allocated to the vector processing unit at the same time, with each thread being allocated to different lanes.

If at step 220, it is determined that the required number of lanes is not less than or equal to a quarter of the available lanes, then pair vector merge processing is instead performed at step 230. In accordance with this approach, a pair of the threads are allocated in a first cycle to the vector unit, allowing the associated processing operation to be performed in parallel for that pair of threads, and then in a subsequent cycle the remaining pair of threads is allocated to the vector unit.

Whilst FIG. 3 is shown for the specific example where the number of threads in the thread group is four, it will be appreciated that the same basic approach can be generalised for any number of threads within the thread group in order to determine situations where vector merge processing can be performed, and in the event that vector merge processing can be performed, to determine the maximum number of threads that can be handled at one time.

Figure 4A:
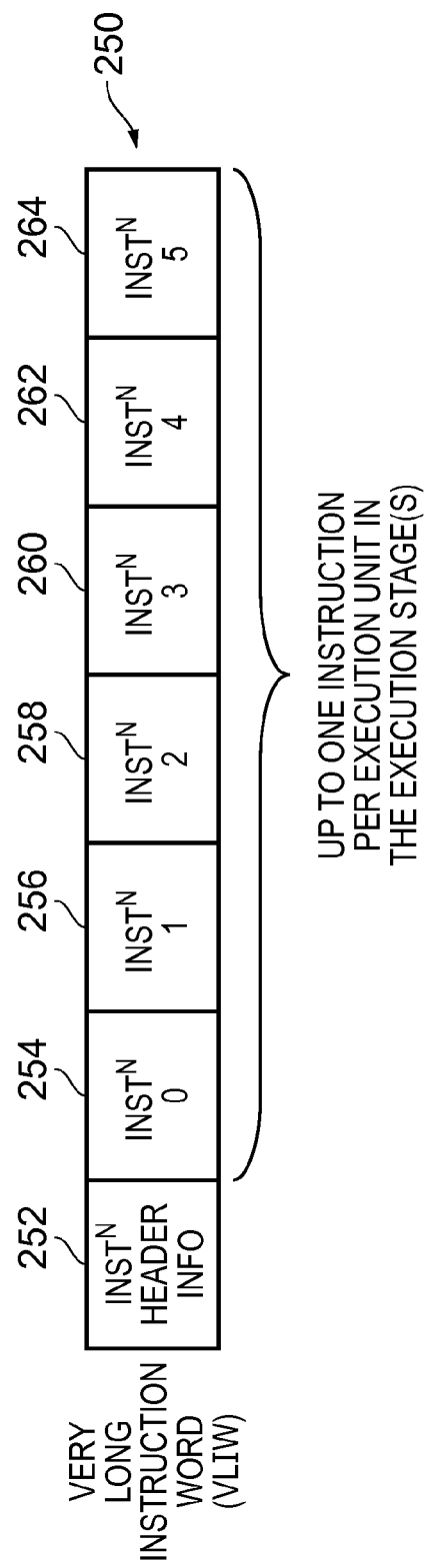
FIG. 4A illustrates a very long instruction word (VLIW) that may be received by the data processing apparatus of FIG. 2 in accordance with one embodiment.

Whilst in one embodiment one instruction at a time may be issued from the instruction cache 70 to the data processing apparatus 50, in accordance with an alternative embodiment as illustrated in FIG. 4A, a very long instruction word (VLIW) 250 is input to the data processing apparatus, this including instruction header information 252 that identifies a number of separate instructions 254, 256, 258, 260, 262, 264 provided within the VLIW 250. In one particular embodiment, there are five separate vector and/or scalar units provided within the execution stages 115, 135, and one branch instruction handling unit, and the VLIW can specify up to one instruction for each unit. The instruction header information 252 is used to identify which units an instruction is being provided for, and hence how many instructions are included within the VLIW 250.

Figure 4B:
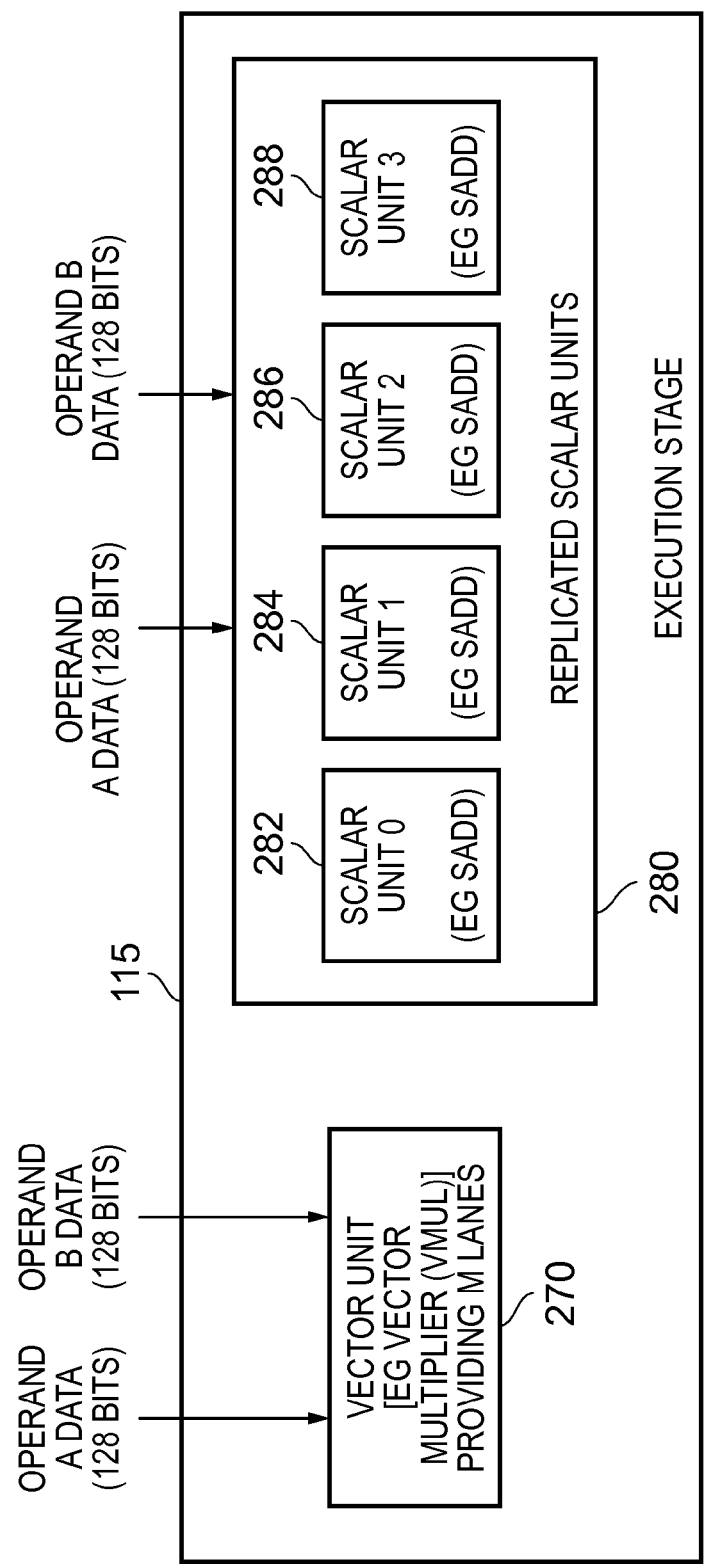
FIG. 4B is a block diagram illustrating both vector and scalar units provided within the execution stage 115 of FIG. 2 in accordance with one embodiment.

FIG. 4B illustrates vector and scalar units that may be provided within the execution stage 115 in accordance with one embodiment. In this embodiment, a vector unit 270 is provided that has M lanes of parallel processing. In one particular embodiment, the operand data provided to the vector unit is 128 bits in width, and eight lanes (each of 16 bits in width) are provided. However, it will be appreciated that the size of the operand data and the number of lanes can vary dependent on embodiment. The vector unit can take a variety of forms, but in the example of FIG. 4B is assumed to be a vector multiplier unit.

In the illustrated embodiment of FIG. 4B, a scalar unit is also provided for executing a scalar operation. However, in this instance, the scalar unit is replicated to form a replicated scalar unit block 280 consisting of multiple replicated scalar units 282, 284, 286, 288. The number of replicated scalar units provided will typically be dependent on the number of threads within the thread group associated with the received instructions. For example, if the thread group is a quad consisting of four threads, then four scalar units may be provided as shown in FIG. 4B. Each scalar unit will be able to perform the same scalar operation, and in the example of FIG. 4B is arranged to perform a scalar add operation.

Typically, replicating scalar units is fairly cheap to implement. Further, by replicating the scalar units, then if the VLIW includes a vector instruction for the vector unit and a scalar instruction for the scalar unit, and the vector merge circuitry determines that vector merge processing is possible, then it is also possible to use the replicated scalar units to perform the scalar operation in parallel for each of the plurality of execution threads allocated at one time to the vector unit. Accordingly, by way of example, if quad vector merge processing can be performed within the vector unit, meaning that the processing operation is performed in parallel in the vector unit for each of the four threads of the quad, then each of the separate scalar units 282, 284, 286, 288 can also be arranged to perform the scalar operation in parallel for each of the four threads.

As a further optional enhancement, in one embodiment the instruction header information 252 may include a field which, when set, identifies that the associated scalar instruction specified for the scalar unit should be treated as a vector instruction, and that in addition the replicated scalar unit block 280 should be treated collectively as an equivalent vector processing unit. Such an approach may be useful irrespective of whether the vector merge circuitry determines at any particular point in time that vector merge processing can be performed. For example, even if vector merge processing cannot be performed, the replicated scalar unit 280 could still be used in one embodiment to perform a simple vector operation.

Figure 5A:
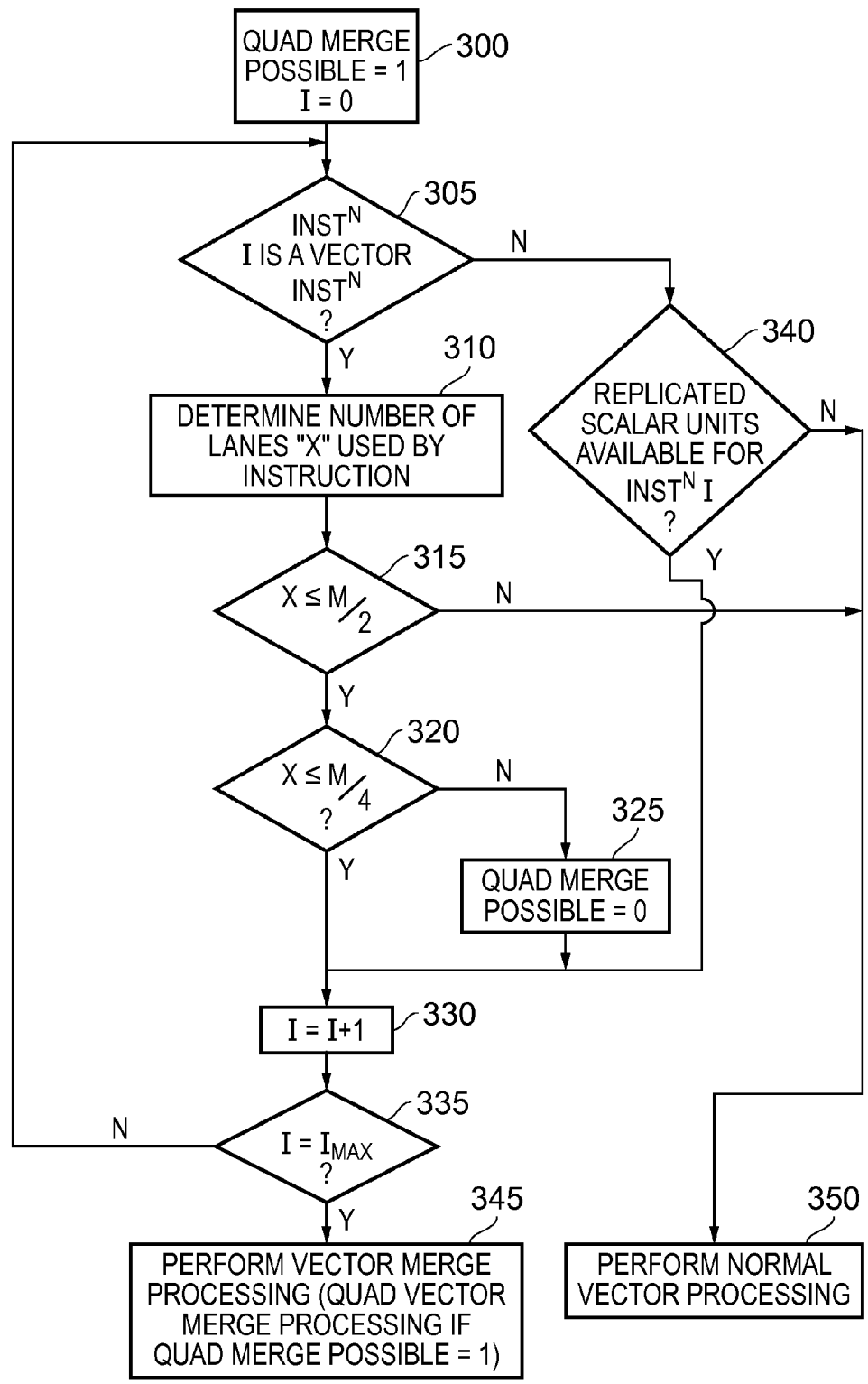
FIG. 5A is a flow diagram illustrating how the various instructions within the VLIW are analysed by the vector merge circuitry of FIG. 2 in accordance with one embodiment, in order to decide whether vector merge processing can be performed.

FIG. 5A is a flow diagram illustrating the operation of the vector merge circuitry 85 of FIG. 2 in one embodiment where a VLIW 250 is received at the data processing apparatus. At step 300, a variable "quad merge possible" is set equal to one, and the variable I is set equal to zero. At step 305, it is then determined whether the instruction I is a vector instruction. If so, the process proceeds to step 310, where the required number of lanes X necessary in order to enable the processing operation of the vector instruction to be performed is determined Thereafter, steps 315 and 320 are performed, these being analogous the earlier described steps 210, 220 of FIG. 3. If at step 315 it is determined that X is less than or equal to half of the total number of lanes, and at step 320 it is determined that X is less than or equal to a quarter of the total number of lanes, then the variable I is incremented at step 330, whereafter it is determined at step 335 whether all instructions in the VLIW have been considered (in one embodiment the total number of instructions being determined by the instruction header information 252 as discussed earlier). If at step 320 it is determined that X is not less than or equal to a quarter of the total number of lanes, then this will preclude quad merge processing for any vector instructions in the VLIW, and accordingly at step 325 the variable quad merge possible is reset to zero.

If at step 305 it is determined that the current instruction being considered is a scalar instruction, then at step 340 it is determined whether replicated scalar units are available for that instruction. If they are, then the process merely continues directly to step 330. However, if there is a scalar instruction and replicated scalar units are not provided, then this will preclude performing vector merge processing, and instead the process will proceed directly to step 350 where normal vector processing will then be performed. This is due to the fact that the scalar instruction will need to be repeated separately for each thread, and accordingly there is no benefit in seeking to process the vector instructions differently.

Similarly, if at step 315 it is determined for any particular vector instruction that the required number of lanes is not less than or equal to half of the total number of available lanes, then again this will preclude performing vector merge processing for any of the vector instructions in the VLIW 250, and hence again the process will at that point proceed directly to step 350 where it will be determined that normal processing is required.

If at step 335, it is determined that all of the instructions have been considered, then the process proceeds to step 345 where it is determined that vector merge processing can be performed. This will either be the full quad vector merge processing if the variable quad merge possible is still equal to one, or will be the earlier described pair vector merge processing if the quad merge possible variable has been cleared to a logic zero value during consideration of any of the vector instructions.

Figure 5B:
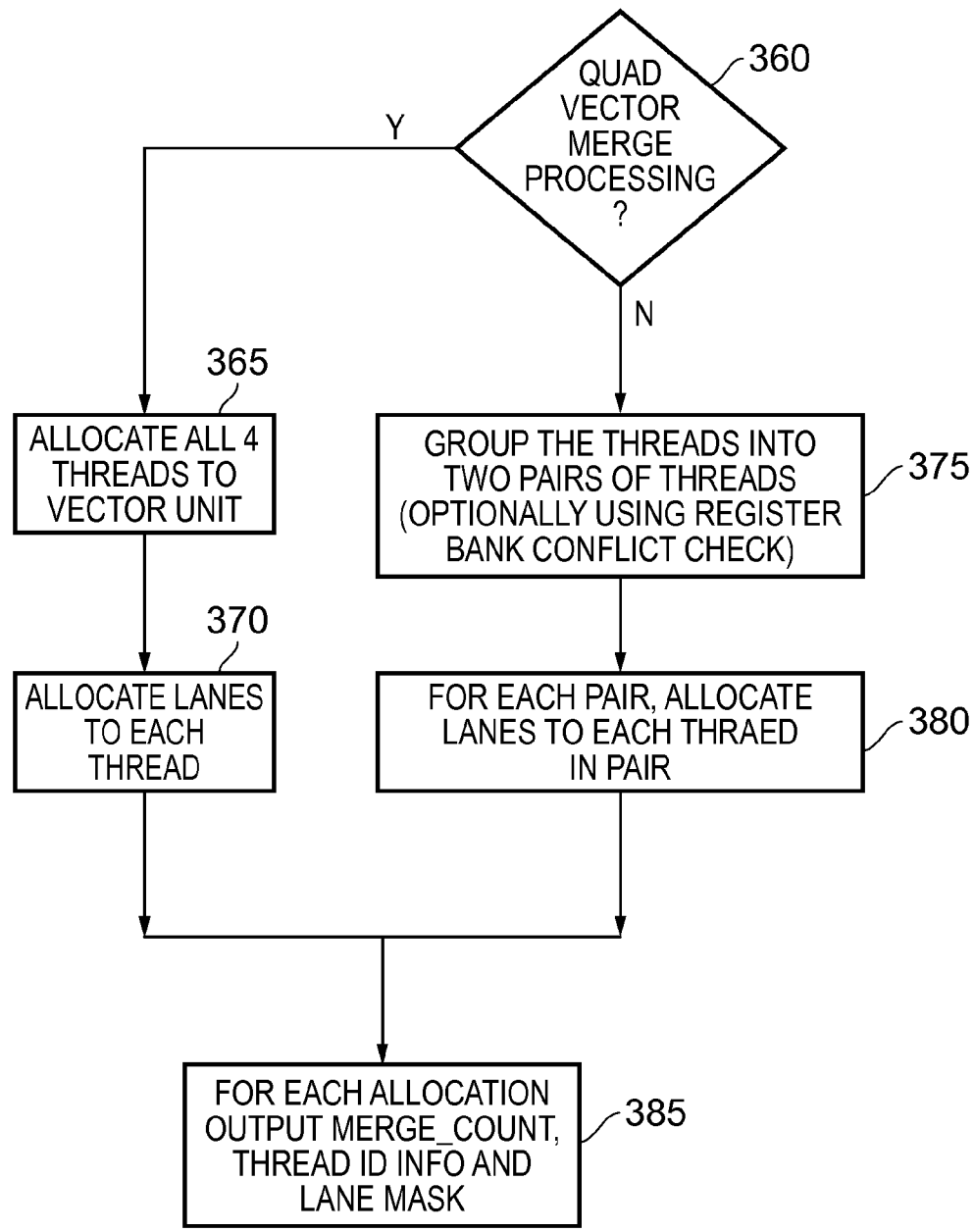
FIG. 5B illustrates steps that may be performed at step 345 of FIG. 5A in accordance with one embodiment.

FIG. 5B is a flow diagram illustrating steps that may be performed at step 345 of FIG. 5A in accordance with one embodiment. At step 360, it is determined with reference to the current value of the quad merge possible variable whether quad vector merge processing is to be performed. If so, then at step 365 all four threads are allocated to the vector unit, and at step 370 separate lanes within the vector unit are allocated to each thread. If it is determined at step 360 that the quad merge possible variable has been cleared to zero, then this will mean that pair merge processing needs to be performed. Accordingly, at step 375 the threads will be grouped into two pairs of threads. This can be done in any appropriate manner, for example it may be predetermined how the threads will be grouped. However, optionally, as will be discussed later with reference to FIG. 6, register bank conflict checking can be performed in order to determine how to group the threads into pairs.

Following step 375, then at step 380, for each allocated pair, lanes are allocated to each thread in that pair. Following either step 370 or step 380, then the vector merge circuitry will output for each allocation a merge count indication, thread identifier info enabling the threads that have been allocated to be identified, and a lane mask identifying how the lanes have been allocated to the particular threads.

Figure 6:
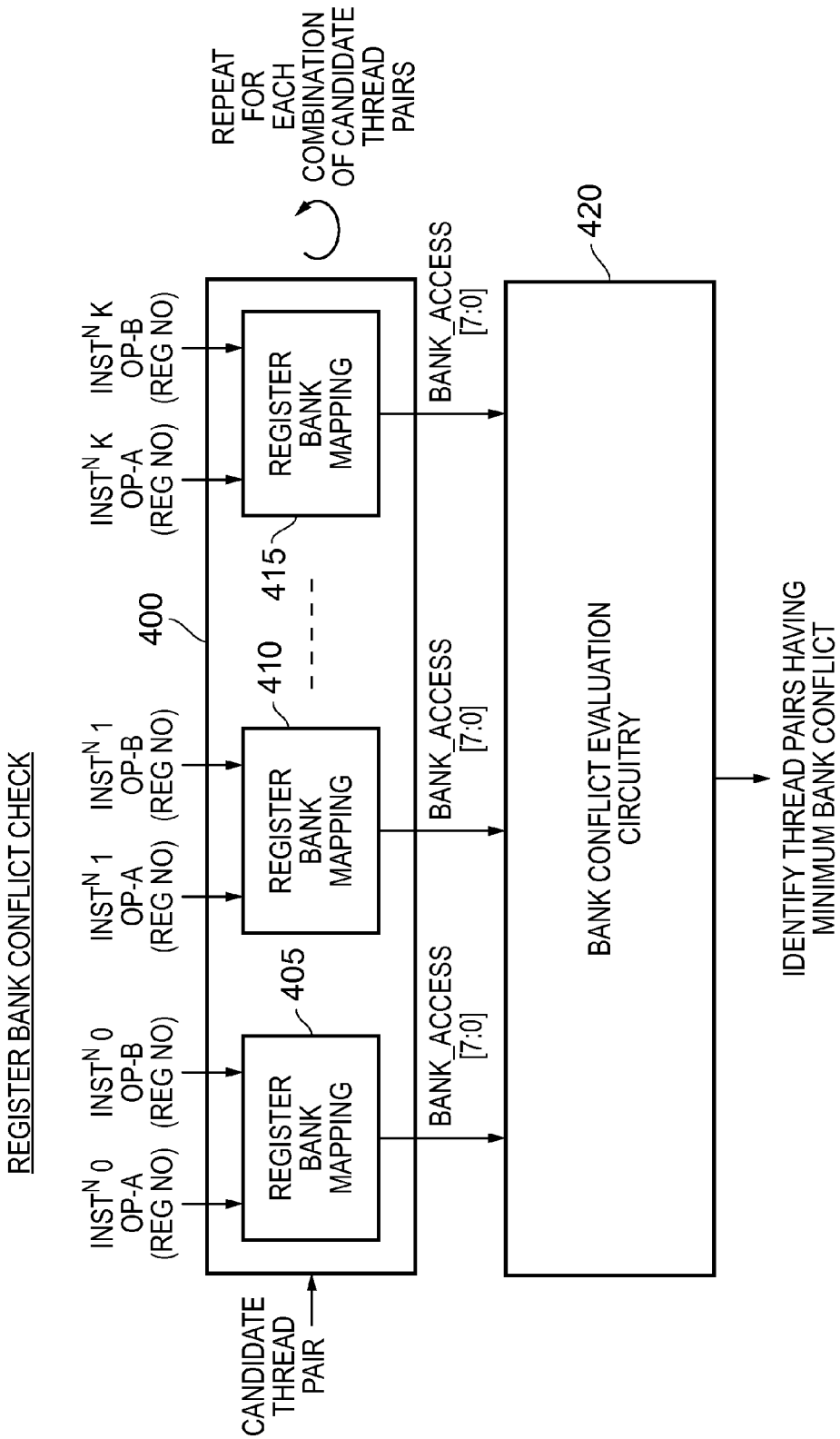
FIG. 6 is a block diagram illustrating register bank conflict checking circuitry that may be incorporated within the vector merge circuitry in accordance with one embodiment.

FIG. 6 is a block diagram illustrating some register bank conflict checking circuitry that may be provided within the vector merge circuitry for optional use at step 375 of FIG. 5B, when it has been determined that the threads need to be grouped into two pairs of threads. As shown in FIG. 6, mapping circuitry 400 includes separate register bank mapping circuits 405, 410, 415 for each separate vector or scalar unit for which an instruction may be provide within the VLIW 250. Hence, if, as per the earlier example, five separate vector and/or scalar units and a branch instruction handling unit are provided within the execution stages, and up to six instructions may be specified in the VLIW 250, then six separate register bank mapping circuits 405, 410, 415 will be provided. Each register bank mapping circuit is arranged to receive the register number identifiers for each of the input operands of the associated instruction.

A mapping table 430 will be maintained by the apparatus identifying where within the various register banks of the working registers the operand data for particular register numbers and particular threads will be stored. An example allocation is shown in FIG. 7. In this example, it is assumed that there are eight banks within the working registers 100.

As can be seen, the operand data for register identifier R0 for thread zero is stored in bank zero at a quad base offset address, whilst the operand data for register identifier R0 for thread one is stored in bank one, the operand data for register identifier R0 for thread two is stored in bank two and the operand data for register identifier R0 for thread three is stored in bank three. FIG. 7 also shows the bank allocations for register identifiers R1 to R7. In one embodiment the same pattern as used for R0 to R7 is then repeated for register identifiers R8 upwards. It will be appreciated that FIG. 7 is merely intended to provide one specific example of how the data may be allocated to the register banks, and it will be appreciated that any other suitable allocation can be used.

Returning to FIG. 6, the circuitry 400 receives a first candidate thread pair with each register bank mapping circuit 405, 410, 415 then determining which banks need to be accessed in order to obtain the data for the required input operand registers for those threads. This bank access information is then output to the bank conflict evaluation circuitry 420, which uses that information to determine situations where there is going to be a conflict in respect of one or more banks, for example where the same bank needs to be accessed more than once for two different registers. Purely by way of example, if threads zero and one are treated as a candidate thread pair, but registers R0 and R4 need to be accessed as input operands, this will cause a bank conflict in both bank zero and bank one, assuming the mapping of FIG. 7.

The bank conflict evaluation circuitry 420 keeps a record of the bank conflicts associated with the current candidate thread pair, and then the process is repeated again for a different candidate thread pair. This process is repeated for each possible candidate thread pair, after which the bank conflict evaluation circuitry 420 can then determine the appropriate pairing of the threads that will produce the minimum amount of bank conflict. The thread pairs giving rise to the minimum bank conflict are then output, and those particular thread pairs are used for the subsequent pair merge processing within the vector units. By such an approach, this minimises the access time associated with accessing the various operand data from the working registers 100, and accordingly increases performance.

Figure 8:
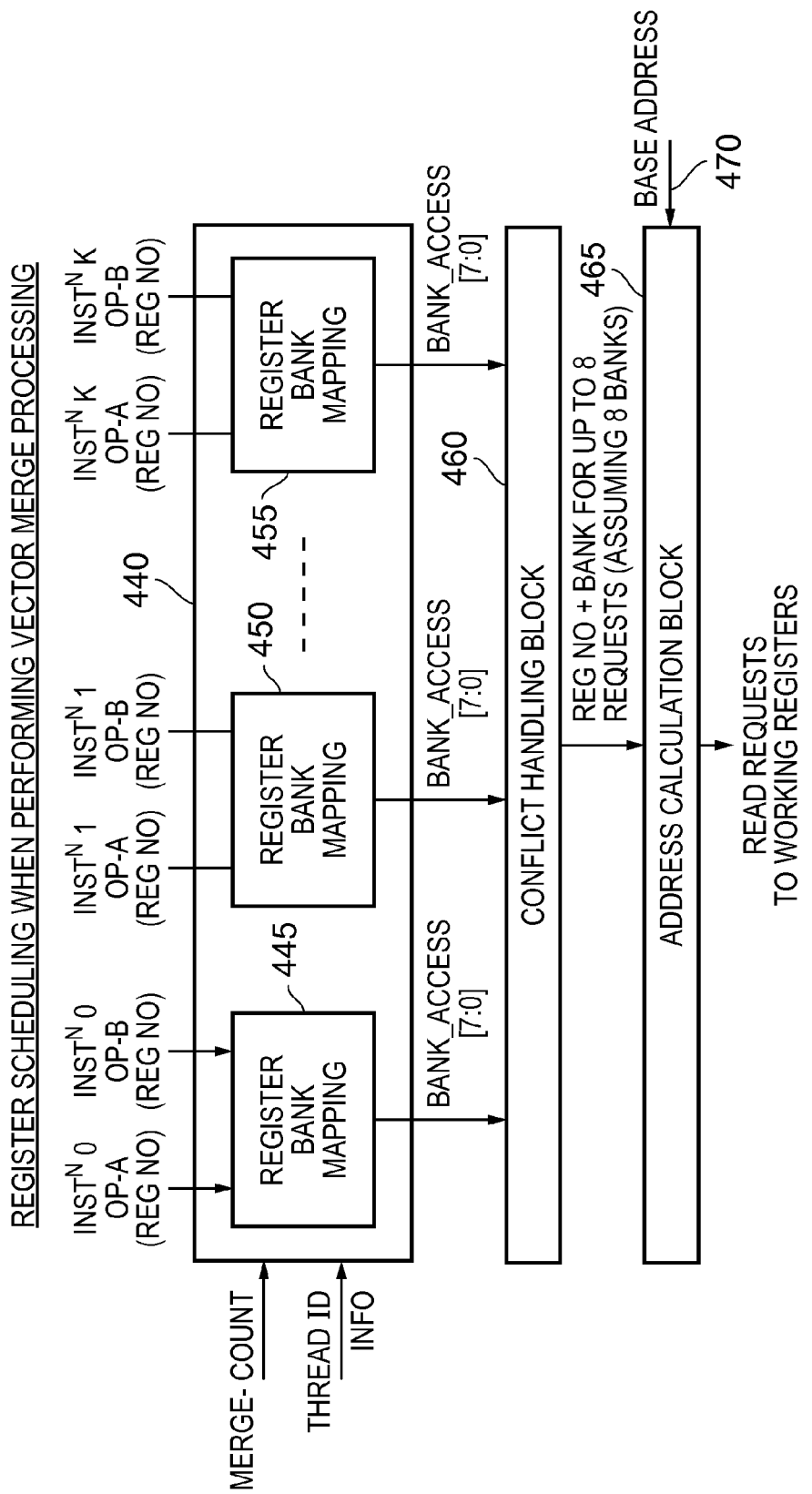
FIG. 8 is a block diagram illustrating the register scheduling circuitry provided as part of the register access circuitry of FIG. 2 in accordance with one embodiment.

Once the vector merge circuitry has determined whether vector merge processing is possible, and if so, whether quad merge processing or pair merge processing is appropriate, the register access circuitry 90 is then used to perform the required read requests in order to obtain the required operand data from the working registers 100. A register scheduling block 95 within the register access circuitry 90 is used to determine how the registers are accessed to obtain the required data, with the aim of obtaining all of the required operand data in the minimum number of clock cycles. The register scheduling circuitry can in one embodiment take the form shown in FIG. 8.

The circuitry 440 is essentially the same as the circuitry 400 described earlier in FIG. 6, and hence includes separate register bank mapping circuits 445, 450, 455, one for each vector and/or scalar unit within the execution stages that an instruction can be specified for in the VLIW. However, in this instance, the circuitry 440 receives the merge-count information, identifying the degree of vector merging to be performed, i.e. whether quad vector merging, pair vector merging, or indeed no vector merging is to be performed, and also the thread ID information identifying the allocated threads. Each of the register bank mapping circuits 445, 450, 455 then refers to the bank mapping table 430 in order to determine which register banks need to be accessed in order to obtain the required operand data. If for any particular VLIW under consideration, one or more of the vector and/or scalar units are not being utilised, and accordingly do not have an instruction specified for them, then the equivalent register bank mapping circuit 445, 450, 455 is not used.

The conflict handling block 460 then uses the bank access information output from the circuitry 440 in order to determine whether there are any bank conflicts, i.e. whether there is any one bank requiring two or more registers to be read from. If so, accesses to that bank will need to be scheduled over multiple cycles in order to obtain the required operand data.

For any particular access cycle, the conflict handling block can output the required register number for up to eight requests, assuming eight banks, i.e. a separate request for each bank. The address calculation block 465 can then use the provided base address 470 (which may be provided as sideband information with the originally received VLIW, or may be obtained by the arithmetic pipeline 50 issuing a query to an allocator module external to the pipeline 50), the register number for a particular bank, and the mapping information 430 of FIG. 7, to determine the actual address within the working registers from which the operand data needs to be obtained, and can issue the corresponding read request to the working registers, with up to one read request per bank per clock cycle in one embodiment.

Figure 9A:
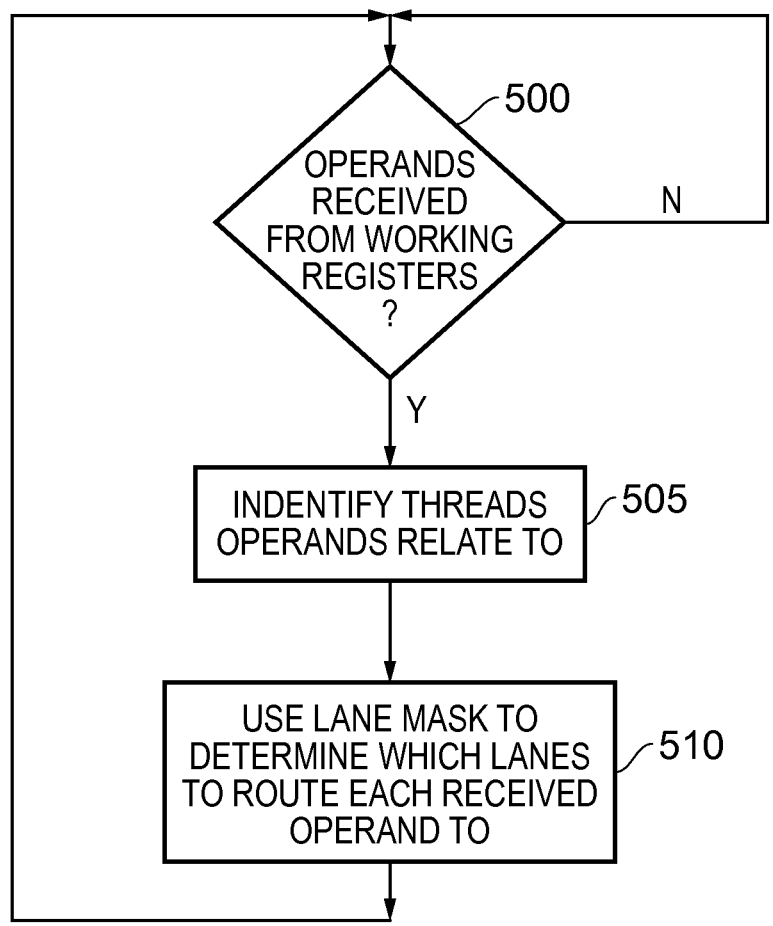
FIG. 9A is a flow diagram illustrating steps performed by the operand routing circuitry of FIG. 2 in accordance with one embodiment.
Figure 9B:
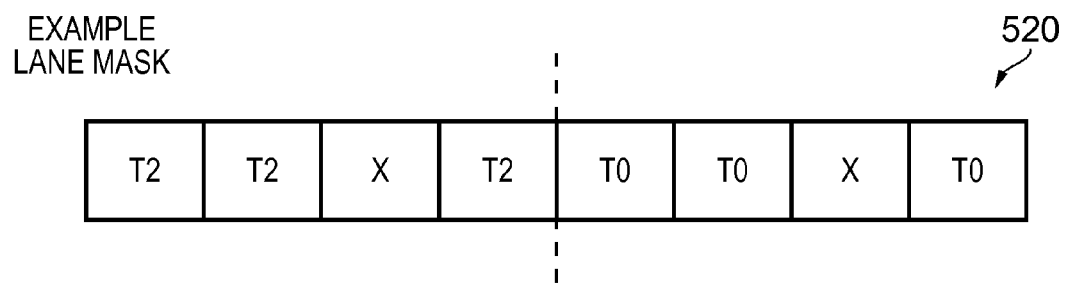
FIG. 9B schematically illustrates an example of a lane mask in accordance with one embodiment.

FIG. 9A is a flow diagram illustrating the operation of the operand routing circuitry 110 upon receipt of operand data from the working registers 100. At step 500, it is determined whether operands have been received from the working registers, and if so, for each received operand, the thread that the operand relates to is identified at step 505. This can for example be identified in side band information passed along with the operand data read from the register bank. Based on the knowledge of the thread that the operand data relates to, the operand routing circuitry can then route the operand data to the required unit within the execution stage. In the event that vector merge processing is being performed, then at step 510 the operand routing circuitry will use the lane mask to determine which lanes within the appropriate vector unit to route each received operand to. This is illustrated by way of specific example with reference to the example lane mask 520 of FIG. 9B. In this example, pair vector merge processing is performed, with threads zero and two being allocated to the vector processing unit at the same time, and thread two using the lower four lanes whilst thread zero uses the upper four lanes. As illustrated in FIG. 9B, it is not essential for all lanes to be used in such a situation, and hence for example both threads zero and two may only require result data to be generated for three of the lanes, and accordingly one of the lanes may not need to be used. If at step 510, the operand routing circuitry receives input operand data for thread two to be used by the vector processing unit, it will route that operand data to the lanes associated with thread two. Conversely, if it receives operand data for thread zero, it will route that data to the lanes allocated for thread zero.

Figure 10:
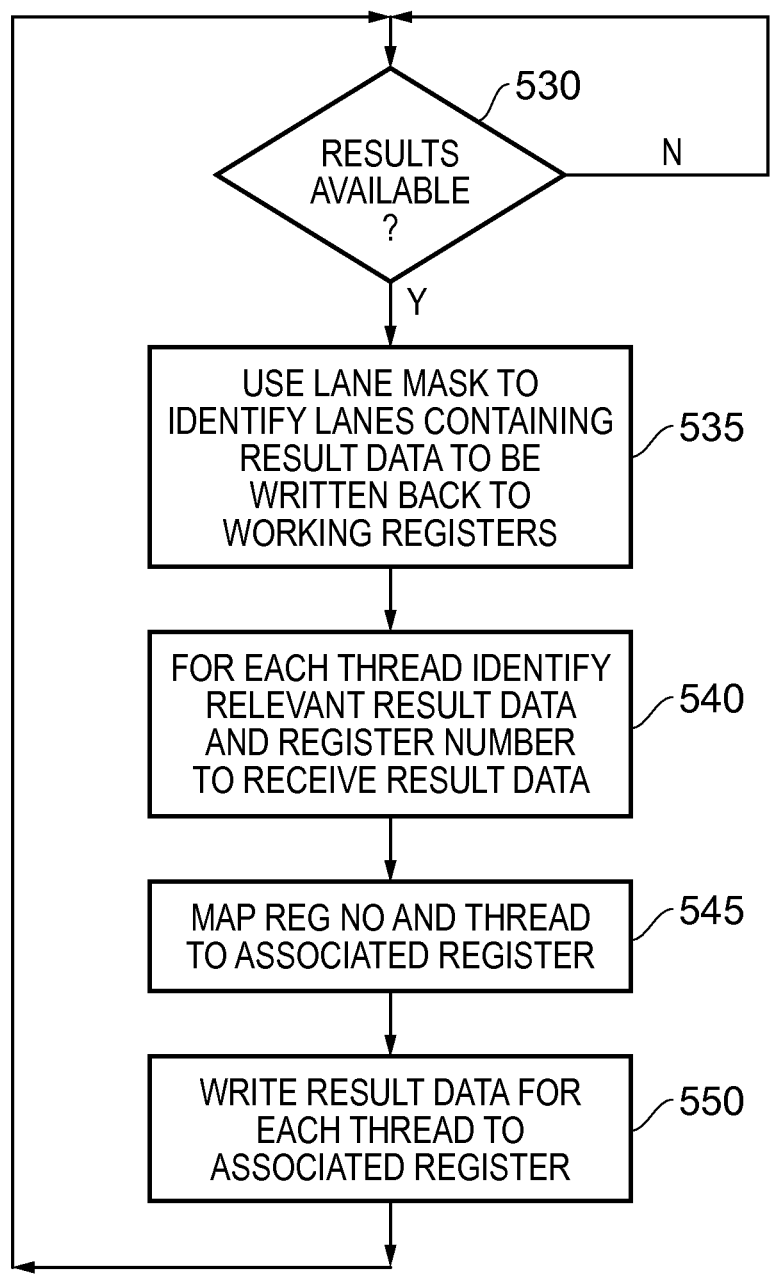
FIG. 10 is a flow diagram illustrating steps performed by the result routing and register write circuitry of FIG. 2 in accordance with one embodiment.

FIG. 10 is a flow diagram illustrating the operation of the result routing and register write circuitry 155 of FIG. 2 in accordance with one embodiment. At step 530, it is determined whether result data is available, i.e. whether the required processing operations have been performed within the execution stage on the input operand data in order to produce corresponding result operand data.

If the result data is available, then at step 535 the lane mask information is used in association with the result data output from any vector unit that has been subjected to vector merge processing in order to identify the lanes containing the result data to be written back to the working registers. Further, at step 540, the relevant result data is identified for each thread allocated to such a vector unit in the event of vector merge processing being performed and in addition the register number to receive the result data is identified. Purely by way of example, if pair vector merge processing has been performed using threads zero and one, and the result data needs to be stored into the register identifier R0, then this information is determined at step 540. Thereafter, at step 545 that information can be used in association with the mapping table 430 of FIG. 7 to identify the address within the working registers 100 that needs to be written to in order to store the result operand data for each thread. For the above specific example, it will be appreciated from FIG. 7 that the result data to be written into R0 for thread zero needs to be written into bank zero at the quad base offset address, and similarly the result data for register R0 for thread one needs to be written into bank one at the quad base offset address.

Thereafter, at step 550, the result data is written for each thread to the relevant register, as discussed earlier with reference to FIG. 2 this being achieved in one embodiment by sending appropriate requests to the register access circuitry 90.

From the above described embodiments, it will be appreciated that such embodiments can give rise to significant performance improvements when performing vector processing operations for multiple execution threads, by ensuring more efficient use of the available lanes of parallel processing within the vector processing unit. For example, within a barrel processor that typically switches between threads of execution on every cycle, it has been found that the use of a vector processing unit within the barrel processor may be inefficient, since at any point in time only a subset of the total available number of lanes of parallel processing may be used. By allowing an input vector instruction to be associated with a group of execution threads, the above described techniques enable situations to be detected where there are enough available lanes of parallel processing to process the instruction for multiple threads at the same time, with each thread in such a situation being allocated to a different subset of the lanes, and with the vector processing unit then performing the associated processing operation in parallel for each of the allocated execution threads. In one embodiment, replicated scalar units are also provided, so that in the event that a VLIW specifies not only a vector instruction to be performed within a vector processing unit, but also a scalar instruction to be performed within a scalar unit, then if it is determined that vector merge processing can be performed, the equivalent scalar operation can also be performed in parallel for each of the allocated threads using the replicated scalar units.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus for processing execution threads, each execution thread specifying at least one instruction, the data processing apparatus comprising:

a vector processing unit providing M lanes of parallel processing, where M is a plural integer, within each lane the vector processing unit being configured to perform a processing operation on a data element input to that lane for each of one or more input operands;

an input interface configured to receive a vector instruction that is specified by a group of said execution threads, the vector instruction identifying an associated processing operation and providing an indication of the data elements of each input operand to be subjected to said associated processing operation;

vector merge circuitry configured to determine, having regard to the indication of the data elements, a required number of lanes of parallel processing for performing the associated processing operation of the vector instruction, the vector merge circuitry being further configured, if the required number of lanes of parallel processing is less than or equal to M/2, to allocate a plurality of the execution threads of the group to the vector processing unit such that each execution thread in said plurality of the execution threads is allocated different lanes amongst said M lanes of parallel processing; and the vector processing unit configured, responsive to the vector merge circuitry allocating a plurality of the execution threads of the group to the vector processing unit, to perform the associated processing operation in parallel for each of said plurality of execution threads.

2. The data processing apparatus as claimed in claim 1, wherein said group of said execution threads comprises N execution threads, where N is a plural integer, and the vector merge circuitry is configured, if the required number of lanes of parallel processing is less than or equal to M/N, to allocate all of the execution threads in said group to the vector processing unit such that the vector processing unit then performs the associated processing operation in parallel for each of the execution threads in said group.

3. The data processing apparatus as claimed in claim 2, wherein if the required number of lanes of parallel processing is less than or equal to M/2, but is not less than or equal to M/N, the vector merge circuitry is configured to allocate a plurality of execution threads of the group to the vector processing unit during a first allocation cycle, and then to allocate a different plurality of the execution threads of the group to the vector processing unit in one or more subsequent allocation cycles, until all of the execution threads of the group have been allocated to the vector processing unit.

4. The data processing apparatus as claimed in claim 1, further comprising:

a further vector processing unit also providing said M lanes of parallel processing;

said input interface is configured to receive an instruction block containing said vector instruction whose associated processing operation is to be performed by the vector processing unit and a further vector instruction whose associated processing operation is to be performed by the further vector processing unit, both said vector instruction and said further vector instruction being specified by said group of said execution threads;

said further vector instruction also providing an indication of the data elements of each input operand to be subjected to its associated processing operation; and said vector merge circuitry is configured to have regard to the indication of the data elements provided by said vector instruction and the indication of the data elements provided by said further vector instruction when determining said required number of lanes of parallel processing, such that said required number of lanes of parallel processing is dependent on which of said vector instruction and said further vector instruction requires the most lanes in order to perform its associated processing operation.

5. The data processing apparatus as claimed in claim 1, further comprising:
a group of scalar processing units, each scalar processing unit in the group being configured to perform the same scalar processing operation;
said input interface is configured to receive an instruction block containing said vector instruction whose associated processing operation is to be performed by the vector processing unit, and a scalar instruction specifying an associated processing operation to be performed by one of said scalar processing units; and
the vector merge circuitry further comprises scalar allocation circuitry, and responsive to the vector merge circuitry allocating a plurality of the execution threads of the group to the vector processing unit, the scalar allocation circuitry is configured to allocate each of said plurality of execution threads to a different one of the scalar processing units within said group of scalar processing units, such that the associated scalar operation is performed in parallel for each of said plurality of execution threads.

6. The data processing apparatus as claimed in claim 5, wherein said group of said execution threads comprises N execution threads, where N is a plural integer, and the vector merge circuitry is configured, if the required number of lanes of parallel processing is less than or equal to M/N, to allocate all of the execution threads in said group to the vector processing unit such that the vector processing unit then performs the associated processing operation in parallel for each of the execution threads in said group, and wherein said group of scalar processing units comprises N scalar processing units.

7. The data processing apparatus as claimed in claim 5, wherein said instruction block includes a field which, when set, indicates that said scalar instruction is to be treated as an additional vector instruction, and said group of scalar processing units are to be treated collectively as forming an additional vector processing unit for performing the associated processing operation of said additional vector instruction.

8. The data processing apparatus as claimed in claim 1, further comprising:
a set of registers for storage of the input operands associated with each execution thread in said group;
the vector instruction being configured to provide an input operand identifier for each input operand to be subjected to the associated processing operation; and
register determination circuitry configured, for each execution thread allocated to the vector processing circuitry, to determine from each input operand identifier a register in said set of registers containing the corresponding input operand associated with that execution thread, and to cause the set of registers to be accessed in order to output the corresponding input operand from the determined register.

9. The data processing apparatus as claimed in claim 8, wherein:
the vector merging circuitry is configured, when allocating a plurality of the execution threads of the group to the vector processing unit such that each execution thread in said plurality is allocated different lanes amongst said M lanes of parallel processing, to maintain lane allocation data identifying which lanes have been allocated to each execution thread in said plurality;
the data processing apparatus further comprising operand routing circuitry configured to receive the input operand output from each determined register and to route the required data elements of that input operand to the lanes indicated by the lane allocation data as having been allocated to the execution thread that that input operand is associated with.

10. The data processing apparatus as claimed in claim 8, wherein said set of registers are formed as a plurality of banks, each bank being accessible separately in each register access cycle.

11. The data processing apparatus as claimed in claim 10, wherein the register determination circuitry further comprises register scheduling circuitry configured to schedule the register accesses required to access the determined registers having regard to the bank in which each determined register resides.

12. The data processing apparatus as claimed in claim 10, wherein:
said group of said execution threads comprises N execution threads, where N is a plural integer, and the vector merge circuitry is configured, if the required number of lanes of parallel processing is less than or equal to M/N, to allocate all of the execution threads in said group to the vector processing unit such that the vector processing unit then performs the associated processing operation in parallel for each of the execution threads in said group;
if the required number of lanes of parallel processing is less than or equal to M/2, but is not less than or equal to M/N, the vector merge circuitry is configured to allocate a plurality of execution threads of the group to the vector processing unit during a first allocation cycle, and then to allocate a different plurality of the execution threads of the group to the vector processing unit in one or more subsequent allocation cycles, until all of the execution threads of the group have been allocated to the vector processing unit;
the merging circuitry is configured, when determining which plurality of execution threads from the group to allocate in each allocation cycle, to perform a bank conflict checking operation with reference to the register determination circuitry in order to choose said plurality of execution threads for each allocation cycle so as to seek to reduce occurrence of multiple registers needing to be accessed from the same bank for any chosen plurality of execution threads.

13. The data processing apparatus as claimed in claim 9, further comprising:
result operand handling circuitry responsive to result data being generated by the vector processing circuitry to reference the lane allocation data in order to identify the lanes containing the result operand for each allocated execution thread, and to then reference the register determination circuitry in order to determine for each result operand the register within said set of registers that the result operand is to be written to.

14. The data processing apparatus as claimed in claim 1, wherein the vector processing unit is provided in a first pipeline stage, and the data processing apparatus further comprises:
one or more additional processing units provided in a subsequent pipeline stage; and forwarding circuitry configured to route output data from the first pipeline stage to the inputs of the subsequent pipeline stage, said routing being dependent on how execution threads have been allocated to the vector processing unit by the vector merge circuitry.

15. The data processing apparatus as claimed in claim 1, provided within a graphics processing unit.

16. A method of processing execution threads, each execution thread specifying at least one instruction, comprising:

providing M lanes of parallel processing within a vector processing unit, where M is a plural integer, within each lane the vector processing unit performing a processing operation on a data element input to that lane for each of one or more input operands;

inputting a vector instruction that is specified by a group of said execution threads, the vector instruction identifying an associated processing operation and providing an indication of the data elements of each input operand to be subjected to said associated processing operation;

determining, having regard to the indication of the data elements, a required number of lanes of parallel processing for performing the associated processing operation of the vector instruction, and if the required number of lanes of parallel processing is less than or equal to M/2, allocating a plurality of the execution threads of the group to the vector processing unit such that each execution thread in said plurality of the execution threads is allocated different lanes amongst said M lanes of parallel processing; and responsive to allocating a plurality of the execution threads of the group to the vector processing unit, causing the vector processing unit to perform the associated processing operation in parallel for each of said plurality of execution threads.

17. A data processing apparatus for processing execution threads, each execution thread specifying at least one instruction, the data processing apparatus comprising:

means for providing M lanes of parallel processing, where M is a plural integer, within each lane the means for providing configured to perform a processing operation on a data element input to that lane for each of one or more input operands;

means for receiving a vector instruction that is specified by a group of said execution threads, the vector instruction identifying an associated processing operation and providing an indication of the data elements of each input operand to be subjected to said associated processing operation;

means for determining, having regard to the indication of the data elements, a required number of lanes of parallel processing for performing the associated processing operation of the vector instruction, the means for determining configured to allocate, if the required number of lanes of parallel processing is less than or equal to M/2, a plurality of the execution threads of the group to the means for providing such that each execution thread in said plurality of the execution threads is allocated different lanes amongst said M lanes of parallel processing; and the means for providing configured to perform, responsive to the means for determining allocating a plurality of the execution threads of the group to the means for providing, the associated processing operation in parallel for each of said plurality of execution threads.

* * * * *